US008542398B2

(12) United States Patent
Reddy

(10) Patent No.: US 8,542,398 B2
(45) Date of Patent: Sep. 24, 2013

(54) METHOD AND SYSTEM TO SELECT A TRIM SIZE

(75) Inventor: Prakash Reddy, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 371 days.

(21) Appl. No.: 12/975,017

(22) Filed: Dec. 21, 2010

(65) Prior Publication Data

US 2012/0154872 A1 Jun. 21, 2012

(51) Int. Cl.
*G06K 15/02* (2006.01)
*H04N 1/40* (2006.01)

(52) U.S. Cl.
USPC ............................................. 358/1.2; 358/2.1

(58) Field of Classification Search
None
See application file for complete search history.

(56) References Cited

U.S. PATENT DOCUMENTS

| 6,430,320 | B1 * | 8/2002 | Jia et al. | 382/289 |
|---|---|---|---|---|
| 6,560,376 | B2 | 5/2003 | Kimbell et al. | |
| 7,424,672 | B2 | 9/2008 | Simske et al. | |
| 7,599,101 | B2 | 10/2009 | Ogiwara et al. | |
| 2006/0279783 | A1 | 12/2006 | Kato | |
| 2008/0018744 | A1 * | 1/2008 | Sasaki | 348/207.2 |
| 2009/0244648 | A1 | 10/2009 | Chan et al. | |
| 2010/0189345 | A1 | 7/2010 | Reddy et al. | |
| 2010/0225937 | A1 | 9/2010 | Simske et al. | |

OTHER PUBLICATIONS

Reddy, et al,; "Cropping Scanned Pages to Remove Artifacts"; U.S. Appl. No. 12/615,771, filed Nov. 10, 2009.
Reddy, et al.; "System and Method for Adding New Content to a Digitized Document"; U.S. Appl. No. 12/489,232, filed Jun. 22, 2009.
Sayers, et al.; "Selection of Flaw Present Within Digitally Scanned Document"; U.S. Appl. No. 12/824,201, filed Jun. 27, 2010.
SunTec—Print on Demand (POD PDF); http://www.suntecindia.com/data-entry-india/print-on-demand-pdf.htm, Dec. 20, 2010.

* cited by examiner

*Primary Examiner* — Barbara Reinier
(74) *Attorney, Agent, or Firm* — Garry A. Perry

(57) ABSTRACT

In one embodiment, a digitized document, formatted as an image file and representing a scanned original page with a page boundary, is received. An image resolution for the digitized document is identified. A height and width of the page boundary, measured in pixels, is identified. A desired trim size for the digitized document is determined based on a function of the identified page boundary height and width and the image resolution. An available trim size that is closest to the desired trim size is selected for printing of the digitized document, via data indicative of available trim sizes stored in a computer-readable medium.

16 Claims, 5 Drawing Sheets

METHOD AND SYSTEM TO SELECT A TRIM SIZE

BACKGROUND

An increasing number of consumers are printing copies of books, magazines, newspapers and other collections of digitized content on an on-demand/as-needed basis. A consumer may choose to print a hard copy of the content via the consumer's printing device. Alternatively, a consumer may choose to have a hard copy printed at a print service provider, to be subsequently delivered to the consumer.

Such on-demand printing is an attractive alternative for the consumer to more traditional means of acquiring hard copy content, such as purchasing the item at a retailer or checking the item out at a library. By utilizing on-demand printing, a consumer can promptly obtain a copy of contemporary and historic books and other collections that would otherwise be difficult and/or prohibitively expensive to retrieve.

Likewise, on-demand printing is attractive to publishers and retailers as it improves profit margins by reducing many of the major expenses associated with traditional publishing and retailing of physical articles. Expenses that may be reduced, and in some cases eliminated, include costs associated with retail and warehousing facilities, and inventory maintenance costs such as financing expense, and financial losses associated with lost, stolen and damaged inventory. Further, the content provider or retailer may be removed from the difficult task of predicting future demand for a particular book or collection that is associated with traditional production runs and ordering.

One method that is used to provide content for on-demand printing is to utilize a scanner or a digital camera to scan the pages of the book, magazine, newspaper or other original article or collection. Digital representations of the scanned original pages are created and may be stored in a computer-readable medium.

BRIEF DESCRIPTION OF THE DRAWINGS

The accompanying drawings illustrate various embodiments and are a part of the specification. The illustrated embodiments are merely examples and do not limit the scope of the claims. Throughout the drawings, identical reference numbers designate similar, but not necessarily identical elements.

The same part numbers designate the same or similar parts throughout the figures.

DETAILED DESCRIPTION OF EMBODIMENTS

Consumer satisfaction may be increased in many circumstances if the print-on-demand book or other print-on-demand article is printed at a trim size that is substantially the same as the trim size of the original hard copy. In this manner, the original publisher's design (e.g., margin space, font size, etc.) and intent is preserved and the resulting print-on-demand article should be more readable. However, it is common that when the pages of the book or other article are scanned the physical dimensions of the pages are not captured or not preserved as part of the digitized record. Without such a record of the original pages' trim sizes, it may not be possible to produce a print-on-demand copy of a book or other collection that approximates the original in an efficient and automated manner. Embodiments described below were developed in an effort to provide a method and system to select a trim size for a digitized document that will produce an accurate replica of the original scanned page and that can be mapped to a trim size that is supported by the printer or print service provider that will print the document.

The embodiments shown in the accompanying drawings and described below are non-limiting examples. Other embodiments are possible and nothing in the accompanying drawings or in this Detailed Description of Embodiments should be construed to limit the scope of the disclosure, which is defined in the Claims.

The following description is broken into sections. The First section, labeled as "Operation", describes example embodiments of a method to select a trim size for a digitized document. The second section, labeled "Components", describes various physical and logical components utilized to implement various embodiments.

Figure 1:
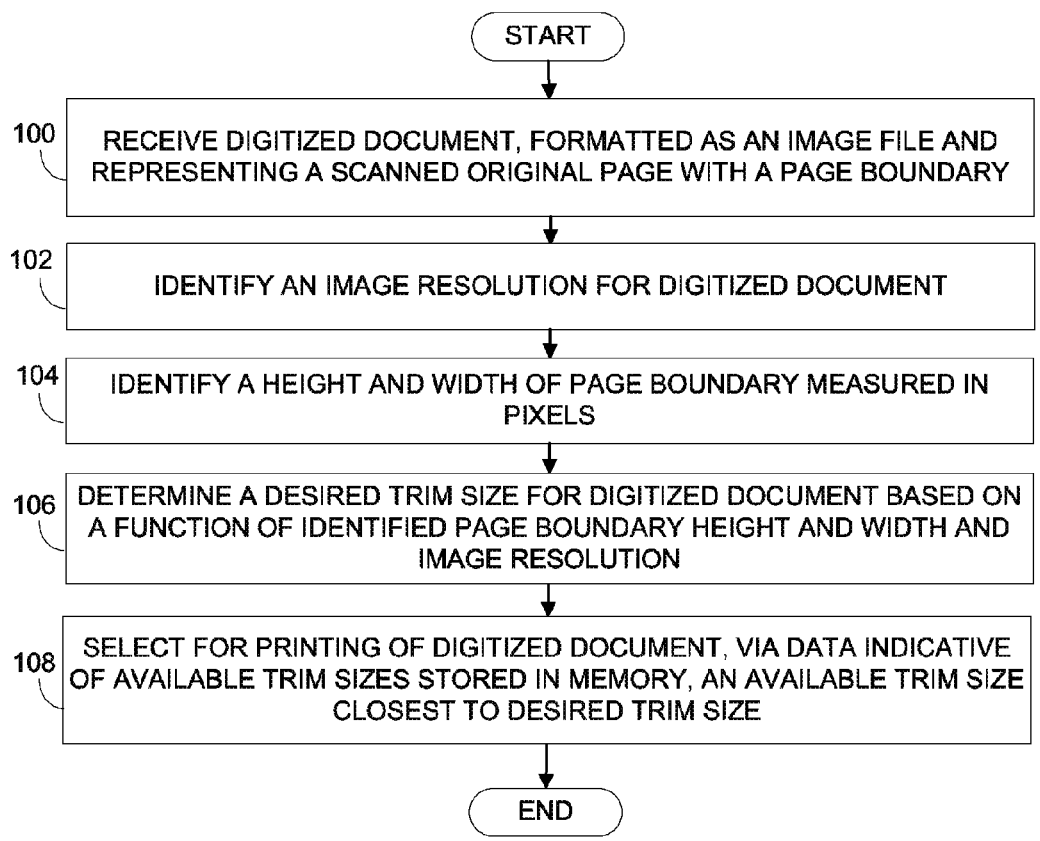
FIGS. 1 and 2 are example flow diagrams depicting embodiments of a method to select a trim size for a digitized document.
Figure 2:
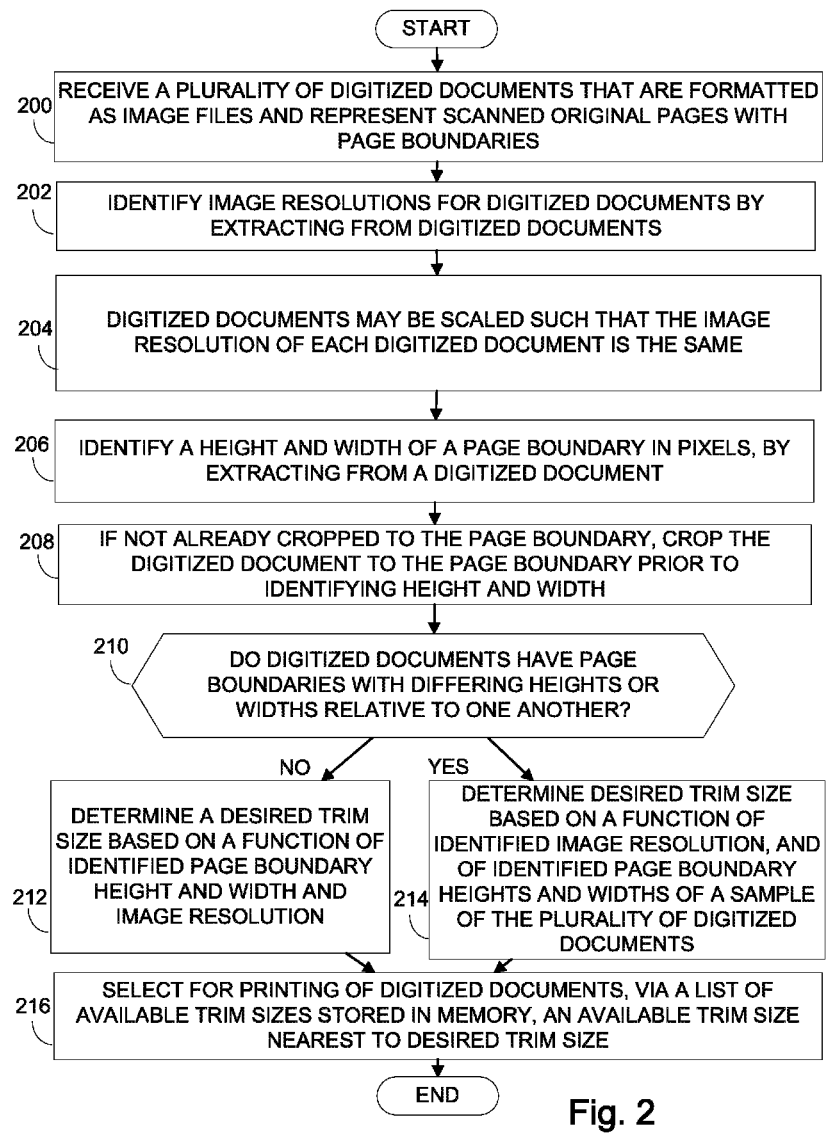

OPERATION: FIGS. 1 and 2 are flow diagrams depicting example embodiments of a method for selecting a trim size for a digitized document to be printed. In discussing FIGS. 1 and 2, reference may be made to the diagrams of FIGS. 3a, 3b, 3c, 3d, 3e, 4a, 4b, 4c, and 5 to provide contextual examples. Implementation, however, is not limited to those examples.

Starting with FIG. 1, in one embodiment of the disclosure a digitized, electronic, or scanned copy of a document (collectively referred to herein as a "digitized document") is received. The digitized document is formatted, wholly or partially, as an image file and represents a scanned original page with a page boundary (block 100). Image files include either pixel or vector (geometric) data that are rasterized to pixels when displayed. Raster formats include; JPEG, TIFF, RAW, PNG, GIF, BMP, PPM, PGM, PBM, XBM, ILBM, WBMP and PNM. Vector formats include: CGM, and SVG.

The digitized document may be the product of scanning of the pages of a book, a magazine, a newspaper or other article or collection. As used herein and in the claims, the term "scanning" or "scan" is an action or process of converting text and/or graphics from a document (for example, a paper document, photographic film, or paper, or other file) to a digital image. Scanning may be accomplished utilizing a flatbed or other scanner, one or more digital cameras, and/or other another electronic device capable of creating digital representations of the scanned original pages. The resulting digital representations of the images (sometimes hereinafter referred to as "digitized documents") are formatted as image files and may be stored in a computer-readable medium. Further, as used herein and in the claims, the term "document" includes any medium of expression, including but not limited to pages of books, magazines, photos, pictures, images, media or any other medium capable of being digitized. Documents can be a single page or span many pages. Note that while this disclosure is discussed primarily with reference to a digitized document which in the original was a page of a book, the teachings of the present disclosure also apply to these other document types.

Figure 5:
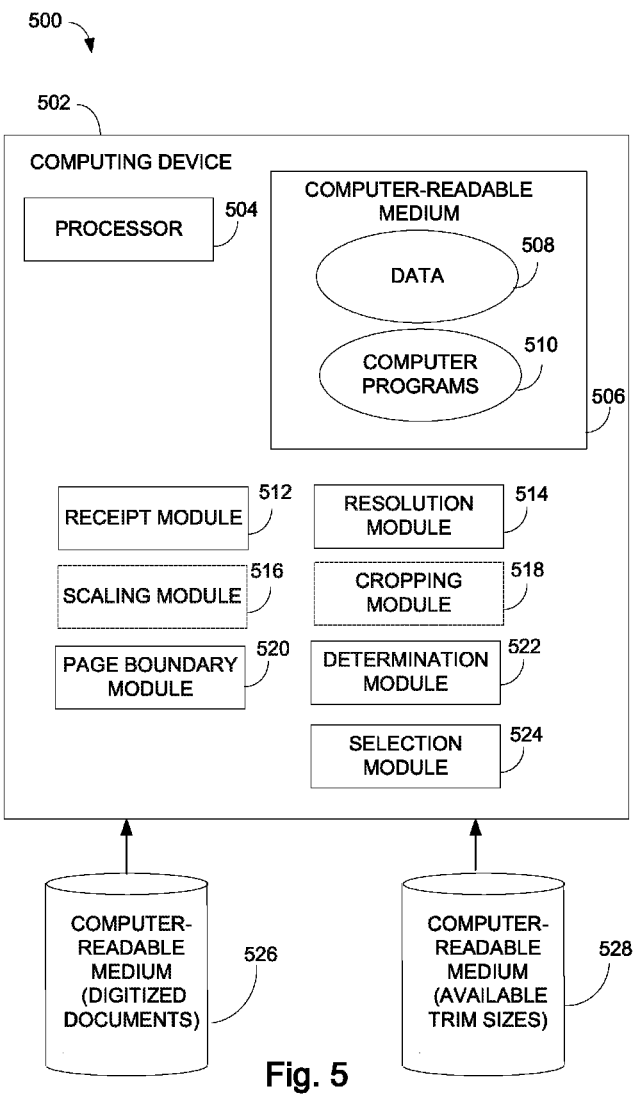
FIG. 5 is a diagram of a system to select a trim size for a digitized document, according to an embodiment of the disclosure.

Referring to FIG. 5, the digitized documents may be received at a computing device 502 from a computer-readable medium 526. In embodiments, the computer-readable medium 526 may be a flash drive or external hard drive. The digitized documents may be received or obtained by other means, including receiving at a processor 504 as data 508 received from a computer-readable medium 506 included within computing device 502. In other embodiments, the digitized documents may be received from other memory storage, received from a transmission (e.g., email), or received from a network location (e.g., downloaded from a server).

Figure 3A:
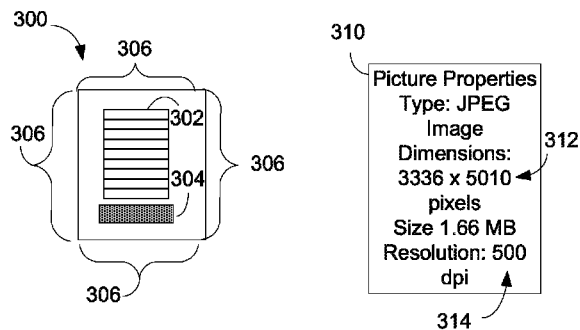
FIGS. 3a-3e and 4a-4c are diagrams depicting examples of a method to select a trim size for a digitized document to be printed, according to embodiments of the disclosure described in FIGS. 1 and 2.

FIG. 3a shows an example of a digitized document 300, formatted as an image file. The digitized document 300 represents a scanned original page, e.g., from a book, and includes content (such as text 302 and image 304) and a page boundary 306.

Returning to the flow diagram of FIG. 1, an image resolution for a digitized document is identified (block 102). In an embodiment, the image resolution may be extracted or obtained from the digitized document itself, e.g., from the metadata in the image file. In another embodiment, the image resolution may be extracted or obtained from a computer file other than the digitized document, e.g., a lookup file that holds image resolution information for a plurality of digitized documents.

Figure 3B:
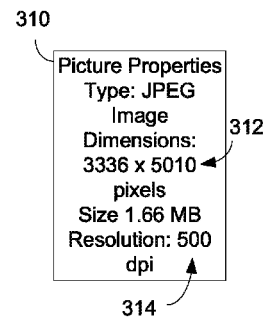

FIG. 3b shows an example of identifying an image resolution for a digitized document, according to an embodiment. A computer file 310 that is a file separate from the digitized document 300 (FIG. 3a) contains "Picture Properties" information for the digitized document 300 (FIG. 3a). The "Picture Properties" provide information that the digitized document is in JPEG image format and has a 500 dpi ("dots per inch") resolution 314. In other embodiments, the resolution 314 may be expressed in another manner, including but not limited to as "ppi" or "pixels per inch". In another embodiment, the image resolution information may be extracted from the digitized document. In an example the extracted information may be that the digitized document has a "x resolution" of 500 dpi and a "y resolution" of 500 dpi, which for purposes of this disclosure is deemed the equivalent of extracted information that the digitized document has a 500 dpi resolution overall.

Returning to the flow diagram of FIG. 1, a height and width of the page boundary measured in pixels are identified (block 104). As used herein and in the claims, the terms "height" and "width" are indicative of measurements along an x and a y axis, and are not meant to exclude an embodiment in which the x and y axis are referred to as "length" and "width" respectively, or otherwise characterized. In embodiments, the height and width may be extracted or obtained from the digitized document itself. In an embodiment, the height and width of the page boundary are extracted or obtained from the digitized document by counting the pixels, vertically and horizontally, to determine the height and width of the digitized document. In an embodiment, height and width may be extracted or obtained from a computer file other than the digitized document. In an embodiment, the height and width are extracted from a same lookup file that is used to identify the image resolution.

Figure 3C:
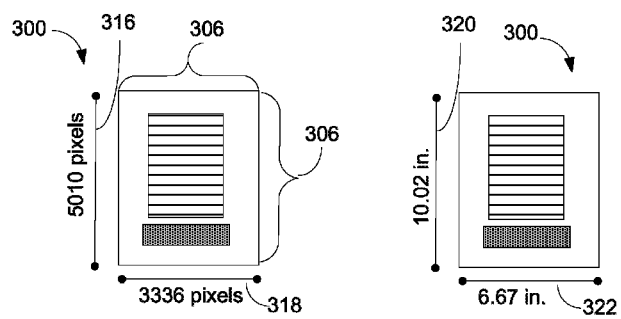

FIGS. 3b and 3c show an example of identifying a height and width of the page boundary measured in pixels, according to an embodiment. The "Picture Properties" data contained within the lookup file 310 provides information 312 that the digitized document is in JPEG format and measures 3336× 5010 pixels in size. It can be identified, utilizing the extracted file information 312, that image border 306 has a height 316 of 5010 pixels and a width 318 of 3366 pixels.

Returning to the flow diagram of FIG. 1, a desired trim size for the digitized document is determined based on a function of the identified page boundary height and width and the image resolution (block 106). As used herein and in the claims, "trim size" means the size of the physical media upon which the digitized documents are printed, after any cropping or trimming. In an example, the trim size of a media is the size of the final pages that are delivered to a consumer, e.g., via the consumer's printer or via a print service provider, for the consumer to read. As used herein and in the claims, a "desired trim size" means a preferred or optimal trim size that may be derived via the disclosed method and system, to approximate the physical dimensions of the original documents as they existed when digitized. In one embodiment, determining the desired trim size includes determining a desired trim height and a desired trim width by using the following equations:

Desired Trim Height=Page Boundary Height/Image Resolution

Desired Trim Width=Page Boundary Width/Image Resolution.

With all variables to the right of the equal-to sign known, the desired trim size, comprising the desired trim height and the desired trim width, can be computed. In other embodiments a desired trim size for the digitized document may determined based utilizing different equations that are functions of the identified page boundary height and width and the image resolution. In an embodiment, desired trim size, comprising a desired height and a desired width, may be expressed in inches. In other embodiments, desired trim size, desired height, and/or desired width may be expressed using a unit of measurement other than inches.

Figure 3D:
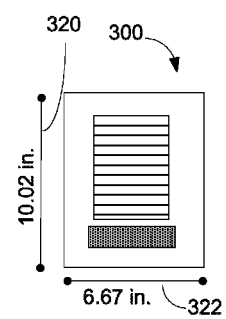

FIG. 3d shows an example of determining a desired trim size for the digitized document based on a function of the identified page boundary height and width and the image resolution, according to an embodiment. Utilizing the equations presented in the previous paragraph, a desired trim size for the digitized document 300 is computed, the desired trim size comprising a desired trim height 320 and a desired trim width 322. In this example the desired trim height 320 is computed as 10.02 inches, and the desired trim width 322 is computed as 6.67 inches.

Returning to the flow diagram of FIG. 1, an available trim size is selecting for printing of the digitized document, via data indicative of available trim sizes stored in a computer-readable medium. The selected trim size is the available trim size that is closest or nearest to the desired trim size (block 108). As used herein and in the claims, "closest to" and "nearest to" are not meant to exclude an exact match if a desired trim size is exactly supported by an available trim size. In other words, a "closest" or "nearest" trim size will be the exact match if there is an available trim size equal to the computed desired trim size.

Referring to FIG. 5, in an example computer-readable medium 528 is a memory in which available trim sizes may be stored. In an embodiment, computer-readable medium 528 may be a memory located within a printer that is electronically connected, e.g., via the Internet, a network or a cable or wireless connection, to computing device 502. As used herein and in the claims, "printer" and "printing device" are used synonymously. In this example, the available trim sizes stored in the computer-readable medium 528 are the trim sizes supported by that printer. In an embodiment, computer-readable medium 528 may store data regarding available trim sizes supported by a particular printer and may be located separate from the printer, e.g., within a print server or in a host computing device that is electronically connected to computing device 502 and to the printer. In another embodiment, the available trim sizes are the trim sizes supported by a particular print service provider, which print service provider may have the ability to utilize printers of varying models and capabilities. In this example, a list of available trim sizes may be stored as data held in a computer-readable medium 528 that is comprised within a computing device that is part of a printer service system and is electronically connected, to computing device 502 via the Internet or a network.

Figure 3E:
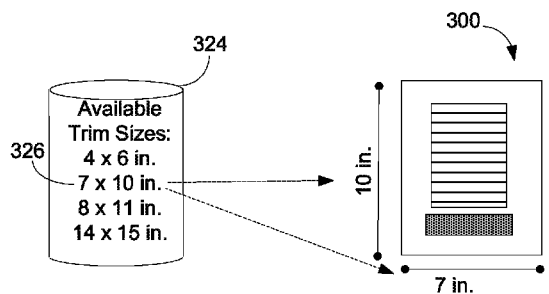

FIG. 3e shows an example of selecting an available trim size for printing of the digitized document, via data indicative of available trim sizes stored in a computer-readable medium. In this example, a list of trim sizes that are supported by a service provider selected to print the digitized document 300 is stored in computer-readable medium 324. The trim sizes supported by this print service provider are "4×6 in.", "7×10 in.", "8×11 in.", and "14×15 in." It is determined that the "7×10 in." available trim size 326 is closest to the computed desired trim size of 6.67×10.02 inches (320 and 322, FIG. 3d). Accordingly, the "7×10 in." trim size is selected for printing the digitized document 300 as it is the available trim size that is the nearest to the desired trim size.

Moving to FIG. 2, in another embodiment a plurality of digitized documents are received, the documents formatted as image files and representing scanned original pages having page boundaries (block 200). It is noted that in some embodiments the front outside, front inside, back inside and/or back outside cover surfaces of a book or article are scanned as pages and are included in the received plurality of digitized documents. In other embodiments, the front inside, back inside and/or back outside covers are scanned as pages, but excluded from the plurality of digitized documents if the cover dimensions substantially different from the dimensions of the regular pages of the book or article.

Image resolutions are identified for the digitized documents by extracting the resolutions from the digitized documents (block 202). In one embodiment, if it is determined that at documents within the plurality have different image resolutions relative to each other, at least one of the plurality of digitized documents may be scaled to change its resolution such that image resolution of each of the plurality of digitized documents is the same (block 204). Scaling of the digitized document may be upward scaling (to increase resolution of a document) or downward scaling (to reduce resolution of a document). Scaling may be accomplished utilizing any of the available methods or techniques for scaling or changing an image size, including but not limited to nearest-neighbor interpolation, bilinear interpolation, bicubic interpolation, supersampling, and variants thereof.

Figure 4A:
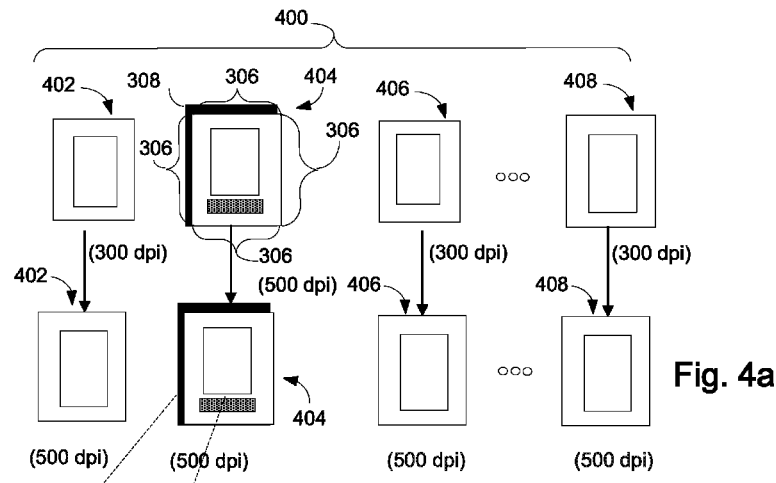

FIG. 4a provides an example of the scaling of digitized documents such that after scaling the resolution of all the documents is the same. In this example, a first document 404 has a resolution of 500 dpi, which is different from the 300 dpi resolution of the other four illustrated documents (402, 406 and 408). In this example digitized documents 402, 406 and 408 are scaled upward to have a resolution of 500 dpi such that after scaling each of the plurality of received digitized documents 400 has a same resolution of 500 dpi.

Returning to FIG. 2, in this example, a height and width of a page boundary of a digitized document, measured in pixels, is identified (block 206). If the digitized document from which the height and width will be identified is not already cropped at the page boundary, the document is cropped to its identified page boundary prior to identifying the height and width (block 208). As used herein, "already cropped" means that digitized document has no border artifacts. As used herein, a "border artifact" is a portion of the digitized document image that is located outside the page boundary.

Figure 4B:
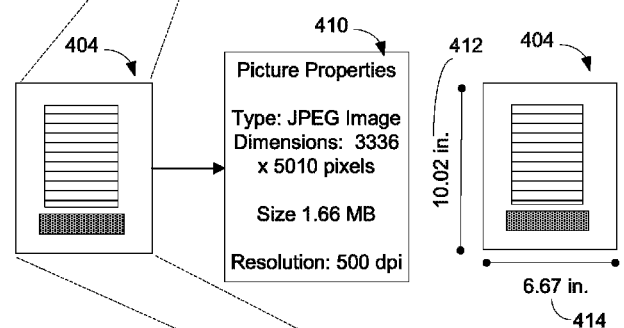

FIGS. 4a and 4b provide an example of cropping of a digitized image to a page boundary. In FIG. 4a, digitized image 404 includes a border artifact 308 that is the result of the scanner or digital camera capturing a partial image of a background behind the original document that was scanned. In FIG. 4b, the border artifact 308 (FIG. 4a) has been removed by cropping the digital image to configure the digitized document 404 such that it includes only the scanned page as defined by the page boundary 306. Various techniques may be used to distinguish a page boundary 306 from a border artifact 308 or other extraneous image outside the page boundary 306 and to effect cropping. In an embodiment, a boundary detection device or application may be utilized in identifying or page boundaries 306, in distinguishing the page boundary 306 from a border artifact 308 or other extraneous image outside the page boundary, and/or in a cropping operation.

In an embodiment, a determination is made as to whether the received digitized documents have page boundaries with differing heights or widths relative to each other (block 210). If it is determined that the plurality of received digitized documents have page boundaries with a substantially same height and width relative to one another, the desired trim size may be determined at this point by dividing an identified page boundary height by the image resolution, and determining a desired trim width by dividing the page boundary width by the image resolution (block 212). If it is determined that the plurality of received digitized documents have page boundaries with differing heights or widths relative to one another, a sample of the heights and widths of the digitized documents may be taken and the average or mean of the sample computed and established as the document height and width for purposes of computing a desired trim size (block 214). In an embodiment, the sample may comprise each of the plurality of digitized documents.

FIG. 4b provides an example of identifying a height and width of the page boundary measured in pixels, and determining a desired trim size for the digitized document in a situation where the digitized documents have substantially the same heights and widths. In this example, a 5010 pixel height and a 3336 pixel width of the page boundary 306 (FIG. 4a) of the first document 404 are identified via extraction of the information from "Picture Properties" metadata 410 embedded in the image of first digitized document 404. In this example, a desired trim size for the plurality of received documents is then determined based on a function of the identified 5010 pixel page boundary height and the 3336 pixel width of first digitized document 404, and the 500 dpi image resolution (that is the resolution of each of the plurality of received documents 400 after the scaling operations illustrated in FIG. 4a). In this example, determining the desired trim size comprises determining a desired trim height 412 of 10.02 inches by dividing the 5010 pixel page boundary height by the 500 dpi image resolution, and determining a desired trim width 414 of 6.67 inches by dividing the 3336 pixel page boundary width by the 500 dpi image resolution.

In a particular embodiment in which each of the received plurality of digitized documents was scaled to a same (i.e. consistent) resolution, trim size may be determined for each of the digitized documents independently to ensure that trim sizes are all similar. As used in this paragraph "similar" suggests within an accepted variance. In this embodiment, if the trim sizes of individual documents are found to be dissimilar, an average trim size may be calculated and used for the plurality of documents. This particular embodiment is one implementation among many possible implementations. For example, in other embodiments in which the resolution scaling takes place, the trim size for the plurality of digitized documents may be calculated without making an individual determination for each document.

Returning to the flow diagram of FIG. 2, an available trim size is selecting for printing of the plurality of digitized documents, via a list of available trim sizes, the list stored as data in a computer-readable medium. The selected available trim size is the available trim size that is nearest to the desired trim size (block 216).

Figure 4C:
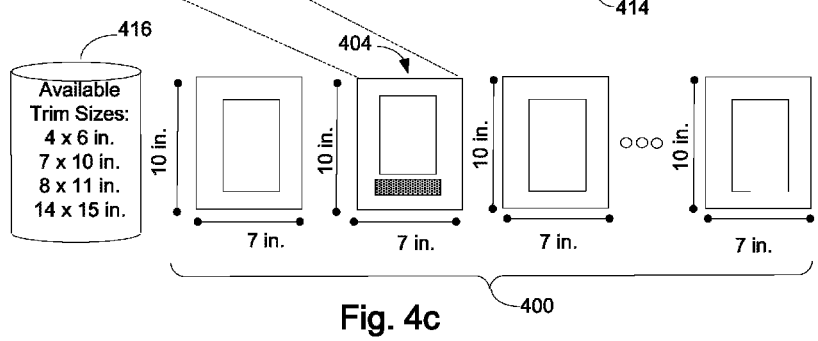

FIG. 4c shows an example of selecting an available trim size for printing of the plurality of digitized documents, via a list indicative of available trim sizes, the list as data stored in a computer-readable medium. In this example the list is stored as data at computer-readable medium 416. The trim sizes supported by the printing device are "4×6 in.", "7×10 in.", "8×11 in.", and "14×15 in." It is determined that the "7×10 in." available trim size is nearest to the computed desired trim size of 6.67×10.02 inches (412 and 414, FIG. 4b). Accordingly, in this example the "7×10 in." available trim size is selected for printing each of the received plurality of digitized documents 400.

COMPONENTS: FIG. 5 shows a rudimentary system 500, according to an embodiment of the disclosure. The system 500 is implemented in FIG. 5 as a single computing device 502, but in other embodiments may be implemented over a number of such computing devices. The computing device 502 includes a processor 504, a computer-readable medium 506 and typically other hardware in addition to the processor 504 and the medium 506. The computer-readable medium 506 may be or include volatile medium, such as semiconductor computer-readable medium, and/or non-volatile medium, such as hard disk drives.

The computer-readable medium 506 stores data 508, which may include digitally scanned documents, and stores one or more computer programs 510. The system 500 includes a number of components 512, 514, 520, 522 and 524. In embodiments, the system 500 may also include components 516 and 518. The components are said to be implemented by the computer programs 510. That is, execution of the computer programs 510 by the processor 504 from the computer-readable medium 506 results in performance of the functionality of the components 512, 514, 516, 518, 520, 522, and/or 524.

Component 512 is a receipt module representing generally any combination of hardware and programming configured to receive a digitized document, formatted as an image file and representing a scanned original page with a page boundary. In this respect, the component 512 performs block 100 of the method embodiment described in FIG. 1, and/or block 200 of the method embodiment of FIG. 2. In embodiments, a plurality of digitized documents may be received, individually, or via a multi-document image file that is separated into separate single-document image files.

Component 514 is a resolution module representing generally any combination of hardware and programming configured to identify an image resolution for the digitized document. In this respect, the component 514 performs block 102 of the method embodiment of FIG. 1, and/or block 202 of the method embodiment of FIG. 2.

Component 516 is a scaling module representing generally any combination of hardware and programming configured to scale at least one of the plurality of digitized documents such that image resolution of each of a plurality of digitized documents is the same. In this respect, the component 516 performs block 204 of the method embodiment of FIG. 2.

Component 518 is a cropping module representing generally any combination of hardware and programming configured to crop the digitized document to the identified page boundary. In this respect, the component 518 performs block 208 of the method embodiment of FIG. 2.

Component 520 is a page boundary module representing generally any combination of hardware and programming configured to identify a height and width of a page boundary measured in pixels. In this respect, the component 520 performs block 104 of the method embodiment of FIG. 1, and/or block 206 of the method embodiment of FIG. 2.

Component 522 is a determination module representing generally any combination of hardware and programming configured to determine a desired trim size for the digitized document based on a function of the identified page boundary height and width and the image resolution. In this respect, the component 522 performs block 106 of the method embodiment of FIG. 1, and/or block 212 and/or block 214 of the method embodiment of FIG. 2. In an embodiment, if a plurality of digitized documents are received, and it is discerned that the plurality of received digitized documents have page boundaries with differing heights or widths relative to one another, determination of the desired trim size may be a function of the image resolution and a height and width that is a medium or average of a sample of heights and widths from the plurality of digitized documents.

Component 524 is a selection module representing generally any combination of hardware and programming configured to select for printing of the digitized document, via data indicative of available trim sizes stored in a computer-readable medium, an available trim size that is closest or nearest to the desired trim size. In this respect, the component 524 performs block 108 of the method embodiment of FIG. 1 and/or block 216 of the method embodiment of FIG. 2.

In the foregoing discussion, various components were described as combinations of hardware and programming. Such components may be implemented in a number of fashions. In one example, the programming may be processor executable instructions stored on tangible computer-readable medium and the hardware may include a processor for executing those instructions. Thus, certain elements operating on the same device may share a common processor and common computer-readable medium.

CONCLUSION: Although the flow diagrams of FIGS. 1 and 2 show specific orders of execution, the order of execution may differ from that which is depicted. For example, the order of execution of two or more blocks may be scrambled relative to the order shown. Also, two or more blocks shown in succession may be executed concurrently or with partial concurrence. All such variations are within the scope of the present disclosure.

FIGS. 3a-3e, 4a-4c, and 5 show the architecture, functionality, and operation of various embodiments. Various components illustrated in FIGS. 3a-3e, 4a-4c, and 5 are defined at least in part as programs. Each such component, portion thereof, or various combinations thereof may represent in whole or in part a module, segment, or portion of code that comprises one or more executable instructions to implement any specified logical function(s). In this respect, the term "executable" includes a program file that is in a form that can be directly (e.g., machine code) or indirectly (e.g., source code that is to be compiled) performed by a processor. The location of a module, section or portion of code may differ for various alternative embodiments. Each component or various combinations thereof may represent a circuit or a number of interconnected circuits to implement the specified logical function(s).

Also, the present disclosure may be embodied in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any medium or media that can contain, store, or maintain programs and data for use by or in connection with the instruction execution system. As used herein and in the claims, "computer-readable media" and "computer-readable medium" are used synonymously. Computer readable media can comprise any one of many physical media such as, for example, electronic, magnetic, optical, electromagnetic, or semiconductor media. More specific examples of suitable computer-readable media include, but are not limited to, a portable magnetic computer diskette such as floppy diskettes or hard drives, a random access memory (RAM), a read-only memory (ROM), an erasable programmable read-only memory, or a portable compact disc.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A non-transitory computer-readable medium storing computer executable instructions that when executed by a processing resource implement a method for selecting a trim size for a digitized document to be printed, comprising:
   receiving a digitized document, as one of a plurality of received digitized documents, formatted as an image file and representing a scanned original page with a page boundary;
   identifying an image resolution for the digitized document and each of the plurality of digitized documents;
   responsive to determining that the plurality of received digitized documents includes at least two documents having different image resolutions, scaling at least one of the plurality of digitized documents such that image resolution of each of the plurality of digitized documents is the same;
   identifying a height and width of the page boundary measured in pixels;
   determining a desired trim size for the digitized document based on a function of the identified page boundary height and width and the image resolution; and
   selecting for printing of the digitized document, via data indicative of available trim sizes stored in a computer-readable medium, an available trim size that is closest to the desired trim size.

2. The medium of claim 1, wherein determining the desired trim size comprises determining a desired trim height by dividing the page boundary height by the image resolution, and determining a desired trim width determined by dividing the page boundary width by the image resolution.

3. The medium of claim 1, wherein the identified image resolution is extracted from the digitized document.

4. The medium of claim 1, wherein the identified image resolution is extracted from a file separate from the digitized document.

5. The medium of claim 1, wherein the height and width for the page boundary are extracted from the digitized document.

6. The medium of claim 1, further comprising cropping the digitized document to the identified page boundary.

7. The medium of claim 1, wherein the height and width for the page boundary are extracted from a file separate from the digitized document.

8. The medium of claim 1, wherein each of the plurality of received digitized documents have page boundaries with a substantially same height and width relative to one another.

9. The medium of claim 1,
   wherein the plurality of received digitized documents have page boundaries with differing heights or widths relative to one another; and
   further comprising identifying the height and width of at least one other digitized document; and
   wherein the determining of the desired trim size is additionally a function of the height and width of the least one other digitized document.

10. The medium of claim 1, wherein the plurality of digitized documents are received via a multi-document image file, and further comprising separating the documents contained in the multi-document file into separate single-document image files.

11. A system for selecting a trim size for a digitized document to be printed, comprising hardware including:
   a receipt module, configured to receive a digitized document, as one of a plurality of received digitized documents, formatted as an image file and representing a scanned original page with a page boundary;
   a resolution module, configured to identify an image resolution for the digitized document and each of the plurality of digitized documents;
   a scaling module, configured to, responsive to determining that the plurality of received digitized documents includes at least two documents having different image resolutions, scale at least one of the plurality of digitized documents such that image resolution of each of the plurality of digitized documents is the same;
   a page boundary module, configured to identify a height and width of the page boundary measured in pixels;
   a determination module, configured to determine a desired trim size for the digitized document based on a function of the identified page boundary height and width and the image resolution; and
   a selection module, configured to select for printing of the digitized document, via data indicative of available trim sizes stored in a computer-readable medium, an available trim size that is nearest to the desired trim size.

12. The system of claim 11, wherein determining the desired trim size comprises determining a desired trim height by dividing the page boundary height by the image resolution, and determining a desired trim width determined by dividing the page boundary width by the image resolution.

13. The system of claim 11, wherein the identified image resolution is extracted from the digitized document.

14. The system of claim 11, wherein the height and width for the page boundary are extracted from the digitized document.

15. The system of claim 11, further comprising a cropping module, configured to crop the digitized document to the identified page boundary.

16. A method for selecting a trim size for a digitized document, comprising:
   receiving a plurality of digitized documents, each formatted as an image file and representing a scanned original page with a page boundary;
   scaling at least one of the plurality of digitized documents such that image resolution of each of the plurality of digitized documents is the same;
   identifying that each of the plurality of digitized documents has a same first image resolution by extracting image resolutions from the digitized documents;
   cropping a first digitized document to a page boundary;

identifying a height and width of the page boundary measured in pixels by extracting from the first digitized document;

determining a desired trim size for the first digitized document, comprising determining a desired trim height by dividing the page boundary height by the first image resolution, and determining a desired trim width determined by dividing the page boundary width by the first image resolution; and selecting for printing of the digitized document, via a list of available trim sizes stored in a computer-readable medium, an available trim size that is nearest to the desired trim size.

\* \* \* \* \*